Patented Feb. 1, 1944

2,340,294

UNITED STATES PATENT OFFICE 2,340,294

CYCLIC ALCOHOL AND PROCESS OF PREPARING

Joseph Paul Bain, Jacksonville, Fla., assignor to Nelio Resin Processing Corporation, Cleveland, Ohio, a corporation of Ohio No Drawing. Application June 21, 1941, Serial No. 399,214

22 Claims. (Cl. 260—489)

The present invention relates to new alcohols and their esters, and more particularly to primary alcohols and their esters derived from nopinene.

Other investigators have reacted formaldehyde or its polymers with certain terpenes to obtain alcohols, however, only poor yields were obtained and under such conditions that the reactions were of little commercial interest. It has now been found that by reaction of nopinene (beta-pinene) and formaldehyde new and hitherto unknown alcohols are produced in good yield under such conditions as to make their production of commercial interest.

At temperatures from about 100° C. to about 225° C. nopinene reacts with paraformaldehyde or other substantially anhydrous form of formaldehyde, such as trioxymethylene, in the presence or absence of certain catalysts, to form a dicyclic primary alcohol having the empirical formula $C_{11}H_{18}O$, probably according to the following reaction, and probably possessing one of the structural formulae indicated:

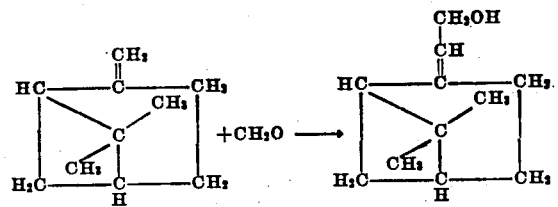

or

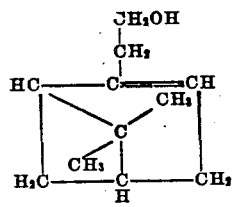

The alcohol is water white, has a pleasant odor and has the following approximate characteristics.

| | |
|---|---|
| B.P. at 10 mm _____°C__ | 110–112 |
| Refractive index ($n_D^{25}$) _____ | 1.49–1.493 |
| Density at 25° C_____ | 0.963–.964 |
| Optical rotation (10 cm. tube, sodium light) degrees_____ | 35 to 37 |

Since the product is an alcohol and is derived from nopinene, it will be referred to as nopol.

The use of catalysts at the lower temperatures is preferred, and they may be used at higher temperatures and higher pressures than atmospheric. The catalysts found suitable are acidic catalysts and a wide variety may be employed, such as zinc chloride, aluminum chloride hydrate, acetic and formic acids, boric acid, phosphoric acid and its salts, sulfuric acid and its salts, etc. The catalyst used, however, must be one which does not cause polymerization to take place in preference to the monomeric condensation of the nopinene with the formaldehyde, such as a large amount of concentrated sulfuric acid.

Catalysts are preferred for better and more economical results at lower temperatures and pressures. At the temperatures required for reaction so much of the formaldehyde is volatilized at atmospheric pressure that little reaction takes place unless catalysts are used. Higher temperatures and pressures are preferred because of increased yields and shorter time of reaction. Also under these conditions the use of catalysts is not necessary although they may be used. The preferred range of operation is from about 150° C. to about 225° C. for the preparation of the nopol.

Reaction, however, does take place at temperatures above 225° C. Somewhat above this temperature, however, the alcohol produced is not a dicyclic alcohol, but apparently a mixture of mono-cyclic primary alcohols isomeric with nopol are formed. At these temperatures it is believed that nopol is first formed and is then isomerized. For example, nopol may be first formed at temperatures below 225° C., and after distillation at 10 mm. to establish its purity and identity it may be heated to 250° C. with the formation of isomeric mono-cyclic alcohols. The following reaction is intended to be merely illustrative of a possible one resulting from the isomerization.

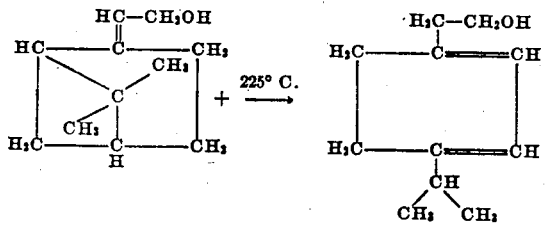

or

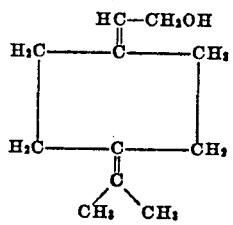

Similarly some isomerization takes place when catalysts are employed in the higher temperature ranges below about 225° C.

In any event the isomerized alcohols are monocyclic primary alcohols possessing two carbon-carbon double bonds, and have boiling points higher than nopol.

When esterifying catalysts, such as acetic acid, are used they may be used in such amounts as to partially or completely esterify the nopol. Likewise nopol may be first formed and separately esterified with aliphatic or cyclic acids, and mono basic as well as polybasic acids. These esters, whether initially formed or formed by esterification of nopol, like the nopol itself, may be thermally isomerized to form the corresponding monocyclic alcohol esters. A wide variety of esterification products is possible.

For example, nopol may be esterified with a dibasic acid such as maleic, and this product isomerized to form an isomerized dinopyl maleate. Or the nopol may be first isomerized and then esterified. This isomerized dinopyl maleate may then be employed as the diene system for reaction with more maleic anhydride, and the adduct then esterified with more nopol. Such a resin possessed a melting point at 72.5° C. Of course other dibasic acids than maleic may be used for forming the nopol esters and other α-B unsaturated dibasic acids used in the diene synthesis and other mono-or polyhydric alcohol or mixtures may be used to esterify the adduct of maleic anhydride and an isomerized nopyl compound. Also when esterification of the adduct is effected with nopol the product may be further isomerized and reacted to form products of varying degrees of hardness, flexibility, etc., depending upon the reagents used, and the extent of further reaction.

The following examples are illustrative of the invention and are indicative of the wide variations possible in carrying out the present invention.

*Example 1*

50 parts by weight of nopinene, 20 parts by weight of paraformaldehyde and one part by weight of zinc chloride are heated at 80° C. to 120° C. The solid paraformaldehyde gradually dissolves in the course of several hours to give a clear solution. The solution is subjected to fractionation and yields 29 parts of alcohol boiling at 108 to 112° C. at 10 mm. pressure.

*Example 2*

1.5 liters of nopinene, 295 g. of paraformaldehyde and 10 g. zinc chloride were heated on a water bath at 60° C. for 2½ hours and at 100° C. for 2 hours. There was little apparent action. The mixture was then heated in an oil bath at 120 to 125° C. for 3½ hours. After washing with water the product was fractionated, 541 cc. of unreacted terpenes were obtained, and the crude yield of alcohol was 883 grams of B. P. 100-113 at 10 mm. pressure.

*Example 3*

210 cc. nopinene and 40 grams of paraformaldehyde (no catalyst used) were heated in a glycerol bath at 120-140° C. for 6 hours and the product fractionated as follows:

| Fraction | B. P.— 20 mm. | Volume | $n_D^{24}$ |
|---|---|---|---|
| 1 | 59.5-60 | 110 | 1.4766 |
| 2 | 60 -60.5 | 70 | 1.4766 |
| 3 | 60.5-120 | 10 | 1.4850 |

The product was thus substantially unreacted nopinene. Although the 3rd fraction may have contained 3 or 4 grams of nopol, it is apparent that at atmospheric pressures a catalyst should be used in order that the reaction may take place at a temperature at which the paraformaldehyde is not substantially completely volatilized.

*Example 4*

408 grams of nopinene (3 moles) and 60 grams of paraformaldehyde (2 moles) were heated in a bomb at 150° C. for 3 hours. The mixture was fractionated, and an undetermined amount of unreacted paraformaldehyde recovered.

| Fraction | Wt. | B. P.— 10 mm. | $n_D^{21}$ | $[\alpha]_D^{(10\ cm.)}$ |
|---|---|---|---|---|
| 1 | 275 cc. terpenes. | | | |
| 2 | 4 g. | 103-109 | | |
| 3 | 153 g. | 109-111 | 1.4916 | -36.74 |
| 4 | 23 g. | 111-115 | 1.4930 | -37.9 |
| Crude yield | 180 g.=54.2% based on paraformaldehyde | | | |

Fraction 1 was unchanged nopinene of at least 95% purity and there was no evidence of any isomerization of nopinene to pinene.

*Example 5*

408 grams of nopinene and 60 grams of paraformaldehyde were heated in a bomb at 150° C. for six hours. The light fraction of unreacted nopinene was separated and the higher boiling alcohol fractionated at 10 mm.

| Fraction | B. P. | Weight | $n_D^{24}$ | $[\alpha]_D^{(10\ cm.)}$ |
|---|---|---|---|---|
| 1 | 98-108 | 7 | 1.4882 | -22.60 |
| 2 | 108-110 | 41 | 1.4906 | -35.26 |
| 3 | 110-110 | 105.5 | 1.4921 | -36.95 |
| 4 | 110-108 | 43 | 1.4925 | -37.33 |
| 5 | 108-106 | 8 | 1.4922 | -35.02 |
| 6 | (¹) | | | |

¹ Residue 5 g.

Crude yield—204 g.=61.4% based on paraformaldehyde.

Example 6

408 grams nopinene and 60 grams of trioxymethylene were heated in a bomb at 200° C. for 3 hours. Unreacted terpenes were removed at 25 inches vacuum and the alcohol fractionated at 10 mm. pressure.

| Fraction | B. P. | Weight | $n_D^{25}$ | $[\alpha]_D^{(10\ cm.)}$ |
|---|---|---|---|---|
| 1 | 100 –108.5 | 13 g. | 1.4882 | –30.26 |
| 2 | 108.5–110 | 91 g. | 1.4914 | –35.90 |
| 3 | 110 –112 | 96 g. | 1.4918 | –36.10 |
| 4 | 110 –112 | 53 g. | 1.4922 | –36.49 |
| 5 | 112 –110 | 13 g. | 1.4928 | –35.92 |
| 6 | 110 | 8 g. | 1.4946 | –33.28 |
| Yield crude alcohol | | 274 g. or 82.5% based on trioxymethylene | | |

The unreacted terpenes were then distilled at 20 mm.

| Fraction | B. P. | Weight | $n_D^{25}$ | $[\alpha]_D^{(10\ cm.)}$ |
|---|---|---|---|---|
| | | *Grams* | | |
| A | 58.5–59.5 | 18 | 1.4760 | –19.49 |
| B | 59.4–60.0 | 65 | 1.4763 | –19.14 |
| C | 60.0–61.0 | 54 | 1.4766 | –18.02 |
| D | 61.0–63.0 | 25 | 1.4766 | –18.67 |

This data indicates that the unreacted terpene fraction is almost pure nopinene.

Example 7

408 grams of nopinene and 60 grams of paraformaldehyde were heated in a bomb for 6 hours at 225° C. The unreacted terpenes were removed at 25 inches vacuum and the alcohol fractionated at 10 mm. pressure at temperatures ranging between 105 and 115° C. The yield of crude nopol was 271 grams or 81.6% based on the paraformaldehyde.

Example 8

A mixture of 157.5 grams of nopinene, 292.5 grams of pinene and 60 grams of paraformaldehyde were heated in a bomb at 150° C. for 3 hours, 85 grams of the alcohol was obtained by fractionation at 10 mm. pressure, equal to 44% yield on the nopinene content of the terpene mixture. The alcohol was pure nopol indicating that alpha-pinene does not react under these conditions to give an alcohol.

Example 9

408 grams of nopinene and 60 grams of paraformaldehyde were heated in a bomb at 250° C. for 3 hours. The lighter fractions were removed at 25 mm. pressure and the alcohols distilled at 10 mm. pressure.

| Fraction | B. P. | Weight | $n_D^{25}$ | $[\alpha]_D^{(10\ cm.)}$ |
|---|---|---|---|---|
| 1 | 90–105 | 7.5 | 1.4828 | –16.0 |
| 2 | 105–108 | 4.5 | 1.4895 | –17.1 |
| 3 | 108–112 | 10.0 | 1.4902 | –20.4 |
| 4 | 112–120 | 27.0 | 1.4928 | –16.3 |
| 5 | 120–126 | 36.0 | 1.4973 | –5.3 |
| 6 | 120–130 | 120.0 | 1.5100 | +2.8 |

Viscous residue of 92 grams.

Example 10

270 grams of nopol were heated at 250–290° C. for 5 hours and fractionated at 10 mm. pressure.

| Fraction | B. P. | Weight | $n_D^{25}$ | $[\alpha]_D^{(10\ cm.)}$ |
|---|---|---|---|---|
| 1 | 120–125 | 6 | | |
| 2 | 125–127 | 58 | 1.4985 | +2.45 |
| 3 | 127–129 | 33 | 1.5025 | +2.60 |
| 4 | (¹) | 140 | | |

¹ Viscous residue.

The cyclobutane ring in nopol was cracked to give a monocyclic alcohol. The viscous residue probably consisted of polymerization products of nopol.

Example 11

A mixture of 166 grams of nopol, 153 grams of acetic anhydride and 5 grams of sodium acetate was heated to boiling and the acetic acid removed as formed. When about the theoretical amount of acetic acid had been produced the mixture was washed with water and fractionated at 10 mm. The yield was 197 grams (95% of theoretical) of colorless nopyl acetate boiling at 118–119 at 10 mm., $n_D^{25}=1.4705$ and $\alpha_D^{(10\ cm.)}=31.5$ to $-32$.

Example 12

70 grams of nopyl acetate was saponified and the saponification product fractionated at 10 mm. 45 grams of nopol, or 80.6% of the theoretical was regenerated indicating that isomerization of nopol does not take place during esterification of saponification.

Example 13

A mixture of 300 grams of paraformaldehyde, 2.2 liters of nopinene and 1.2 liters of glacial acetic acid was slowly heated to boiling. After the paraformaldehyde had dissolved, the mixture was refluxed for 24 hours. Water, acetic acid and unreacted terpenes were distilled and the higher boiling residue fractionated at 10 mm. pressure. There was obtained 828 grams of nopyl acetate, B. P. 10 mm. 116–120° C., or 39.8% yield based on the paraformaldehyde. There was also obtained 632 grams of material boiling above 120° C. These higher fractions probably consist of monocyclic alcohol acetates formed by opening of the cyclobutane ring and also a mixture of diacetates probably of the terpineol and borneol type, probably formed from hydration products resulting from H₂O produced during esterification or by addition of acetic acid to the cyclobutane ring or the double bond of nopol.

Example 14

408 grams of alpha pinene and 60 grams of paraformaldehyde were heated in an autoclave at 150° C. for 3 hours. There was apparently no reaction, as 84% of pure paraformaldehyde was recovered and the alpha pinene was recovered almost quantitatively.

While the reaction which takes place between the nopinene and formaldehyde is mole for mole, it is preferred to use an amount of nopinene somewhat in excess of this ratio. The reason is that the paraformaldehyde is the more expensive ingredient and may be used more completely and with better yields based on the paraformaldehyde if the paraformaldehyde is used in less than theoretical quantities. It is better to recover unreacted nopinene than to recover unreacted paraformaldehyde. In general it has been found that a good reaction mixture to give high yields of nopol may be in the proportion of 3 moles of nopinene to 2 moles of CH₂O though these proportions may, of course, be varied within wide limits.

Also the nopinene need not be pure. It is, of course, desirable to use a product containing as high a percentage as practical, as the presence of unreactive diluents serves to decrease the yield from the mixture. However, diluents may be used if desired. Such inert diluents as alpha pinene, benzene, or other inert solvents may be present, or a solvent such as alcohol may be used to dissolve the paraformaldehyde, but in general it is preferred not to use diluents.

While a temperature of about 225° has been indicated as the point at which isomerization occurs it is desired to point out that while at this temperature condensation is probably complete some isomerization may also have taken place if the conditions have been somewhat severe. Thus when catalysts and/or when prolonged reaction times at this temperature are employed some isomerization may take place. However, upon completion of the condensation at this temperature the amount of isomerized material will ordinarily be small. Similarly, when the condensation is effected at say 250°, there may be some dicyclic alcohol in the product when shorter reaction times are employed. It appears that condensation to the dicyclic alcohol first occurs and isomerization then takes place. Thus while a temperature of about 225° is indicated as that at which thermal isomerization takes place, other factors such as time, catalysts, concentrations, etc., may effect the proportion of isomerized and non-isomerized products produced.

It is thus seen that according to the present invention substantial yields of alcohols and esters may be obtained from the condensation of substantially anhydrous formaldehyde and nopinene. These alcohols and esters are not, strictly speaking, terpene alcohols and esters, they are homologous therewith, and are very reactive. They are thus useful as starting materials for the synthesis of other compounds, and may be employed in the production of perfumes, solvents, plasticizers, resins, etc. They are also readily convertible in good yields into compounds of the apocamphane series which are of interest in the preparation of medicinals. Polyhydric alcohols may be formed by hydration of the mono-hydric alcohol.

Having described the invention, what is claimed is:

1. A primary dicyclic alcohol of the empirical formula $C_{11}H_{18}O$ identical with that produced by the monomeric condensation of nopinene with substantially anhydrous formaldehyde at a temperature below about 225° C., said alcohol being further characterized by having approximately the following physical characteristics:

B. P. at 10 mm. pressure_____°C__ 110–112
Refractive index $n_D^{25}$_____ 1.49
Density at 25° C._____ 0.963 to 0.964
Optical rotation (10 cm. tube sodium light_____ −35 to −37

2. Carboxylic acid esters of the alcohol of claim 1.

3. Monocyclic alcohols identical with those produced by the thermal isomerization of the alcohol of claim 1.

4. The acetate of the alcohol of claim 1.

5. The process which comprises condensing nopinene with substantially anhydrous formaldehyde in the presence of a catalyst which favors monomeric condensation in preference to polymerization to form monohydric primary alcohols having the empirical formula $C_{11}H_{18}O$.

6. The process which comprises heating a mixture of nopinene and a substantially anhydrous form of formaldehyde at temperatures between about 100 and about 225° C. under catalytic conditions bringing about a monomeric condensation of the nopinene and formaldehyde in preference to polymerization to form a monohydric dicyclic primary alcohol having the empirical formula $C_{11}H_{18}O$.

7. The process which comprises heating a mixture of nopinene and a substantially anhydrous form of formaldehyde at a temperature between about 150° C. and about 225° C. at super-atmospheric pressures to bring about a monomeric condensation of the nopinene and formaldehyde to form a monohydric dicyclic primary alcohol having the empirical formula $C_{11}H_{18}O_2$.

8. The process which comprises heating a mixture of nopinene and a substantially anhydrous form of formaldehyde at temperatures between about 100° and about 150° C. at atmospheric pressures in the presence of an acidic catalyst to bring about a monomeric condensation of nopinene and formaldehyde to form a monohydric dicyclic primary alcohol having the empirical formula $C_{11}H_{18}O_2$.

9. The process which comprises heating nopinene and a substantially anhydrous form of formaldehyde at atmospheric pressures in the presence of an acid to bring about monomeric condensation of the nopinene and formaldehyde to form monohydric primary alcohols having the empirical formula $C_{11}H_{18}O$.

10. The process which comprises heating a mixture of nopinene and a substantially anhydrous form of formaldehyde at temperatures between about 100° C. and about 225° C. to effect monomeric condensation of the nopinene and formaldehyde and thereafter heating the condensation product at a temperature above about 225° C. but below a temperature at which substantial polymerization takes place, to bring about thermal isomerization of the initial condensation product.

11. The process which comprises heating a mixture of nopinene and a substantially anhydrous form of formaldehyde at a temperature of about 100° C. to about 150° C. at atmospheric pressure in the presence of an acid catalyst to effect monomeric condensation of the nopinene and formaldehyde and thereafter heating the condensation product at temperatures bringing about a thermal isomerization of the condensation product, but insufficient to effect substantial polymerization.

12. The process of claim 11 in which the catalyst is a carboxylic acid used in sufficient amounts to effect substantial esterification of the alcohol formed by the condensation.

13. The process which comprises heating the alcohol of claim 1 at a temperature above about 225° C. to effect isomerization of the dicyclic alcohol to a monocyclic alcohol.

14. The process which comprises heating a carboxylic acid ester of the alcohol of claim 1 at elevated temperatures to effect isomerization of the dicyclic structure of the alcohol residue to a mono cyclic structure.

15. The process which comprises heating a mixture of nopinene and a substantially anhydrous form of formaldehyde at a temperature in excess of about 225° C., but below that at which substantial polymerization takes place, to form monocyclic alcohols of the empirical formula $C_{11}H_{18}O$ isomeric with the dicyclic alcohol formed at temperatures below about 225° C.

16. The process which comprises heating a mixture of nopinene and a substantially anhydrous form of formaldehyde under superatmospheric pressures at a temperature between 150° C. and 225° C., to effect monomeric condensation of the nopinene and formaldehyde to a dicyclic primary alcohol, and thereafter heating the condensation product at a temperature above 225° to effect a thermal isomerization of the dicyclic alcohol to monocyclic alcohols.

17. The process which comprises heating nopinene and a substantially anhydrous form of formaldehyde at temperatures of about 100° to about 150° C. in the presence of a carboxylic acid in amounts sufficient to effect esterification of the monohydric primary alcohol formed by the monomeric condensation of nopinene and formaldehyde.

18. The process which comprises heating nopinene and a substantially anhydrous form of formaldehyde at superatmospheric temperatures and pressures below those at which substantial polymerization takes place, to bring about a monomeric condensation of nopinene and formaldehyde to form monohydric primary alcohols having the empirical formula $C_{11}H_{18}O$.

19. The process which comprises heating nopinene and a substantially anhydrous form of formaldehyde at temperatures above 100° C. and below temperatures at which substantial polymerization takes place under conditions bring about monomeric condensation of the nopinene and the formaldehyde, the molecular ratio of nopinene to $CH_2O$ being at least 1.

20. Primary, cyclic, unsaturated, monomeric, monohydric alcohols produced by the condensation of nopinene with anhydrous formaldehyde.

21. Esters of the alcohols of claim 20.

22. Cyclic, unsaturated monomeric compounds having the empirical formula $C_{11}H_{17}OR$ in which R is hydrogen or an acyl group, said products being identical with those produced by the monomeric condensation of nopinene with anhydrous formaldehyde in the presence of a carboxylic acid.

JOSEPH PAUL BAIN.

CERTIFICATE OF CORRECTION.

Patent No. 2,340,294. February 1, 1944.

JOSEPH PAUL BAIN.

It is hereby certified that error appears in the printed specification of the above numbered patent requiring correction as follows: Page 1, second column, line 8, for "35 to 37" read -- -35 to -37 --; page 2, first column, line 52, for "melaic" read --maleic--; and that the said Letters Patent should be read with this correction therein that the same may conform to the record of the case in the Patent Office.

Signed and sealed this 23rd day of May, A. D. 1944.

Leslie Frazer (Seal) Acting Commissioner of Patents.